Oct. 2, 1951  V. G. KLEIN ET AL  2,569,766
VALVE
Filed Jan. 27, 1945
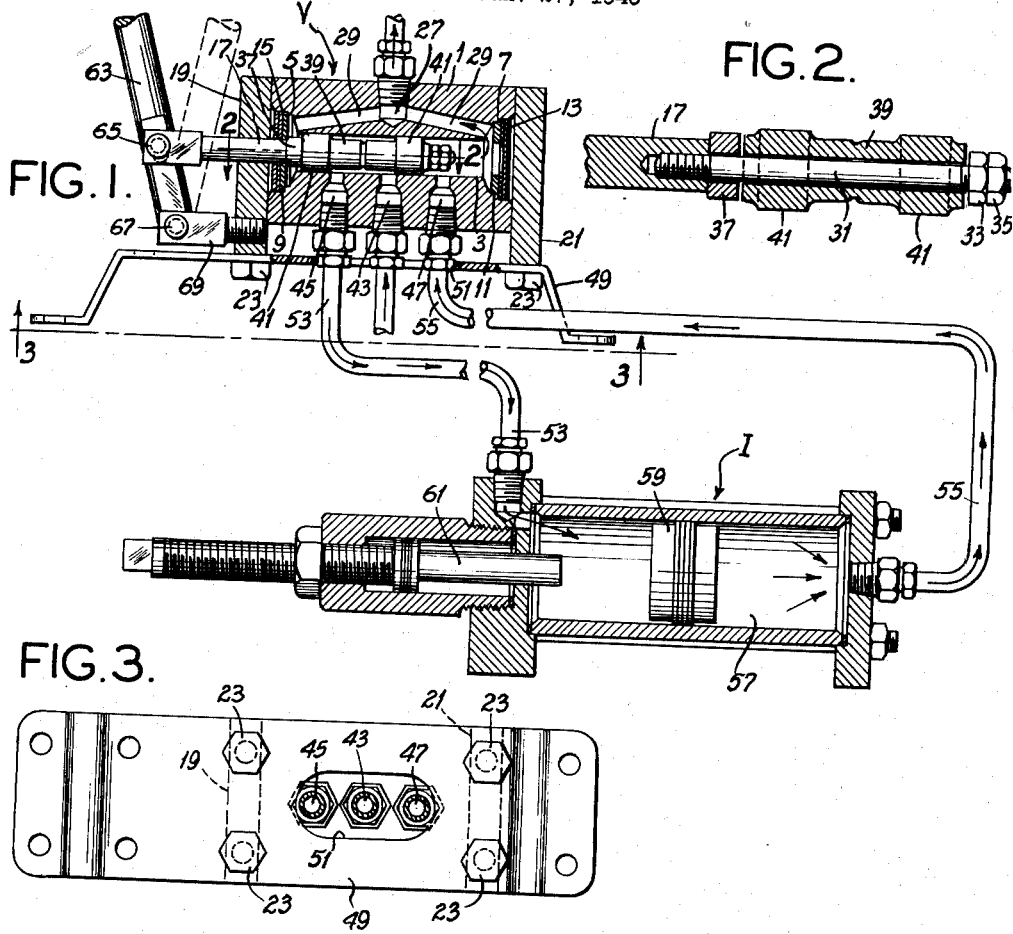
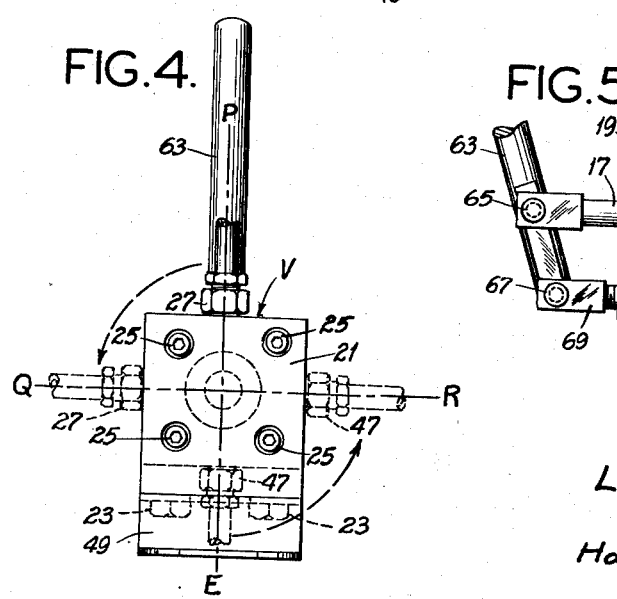
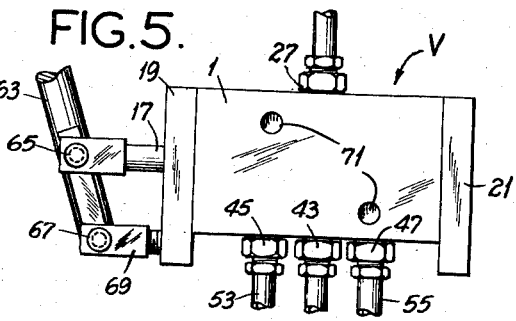
Victor G. Klein,
Lutwin C. Rotter,
Inventors.
Haynes and Koenig
Attorneys Patented Oct. 2, 1951

2,569,766

UNITED STATES PATENT OFFICE 2,569,766

VALVE

Victor G. Klein, St. Louis, and Lutwin C. Rotter, Maplewood, Mo., assignors to Lincoln Engineering Company, St. Louis, Mo., a corporation of Missouri Application January 27, 1945, Serial No. 574,852

3 Claims. (Cl. 251—76)

1

This invention relates to valves, and with regard to certain more specific features to a high-pressure lubricant-dispensing valve.

Among the several objects of the invention may be noted the provision of a so-called four-way valve for connecting two conduits alternately to lubricant supply and delivery pipes; the provision of a valve of the class described which may be made with a high degree of precision and little leakage between its operating parts yet which is not subject to binding between these parts under distortions; and the provision of a valve of this class which is feasible and economical to construct. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a longitudinal section of the valve showing its application to certain pressure conduits;

Fig. 2 is an enlarged longitudinal section of a piston valve plunger;

Fig. 3 is a bottom plan view of the valve and its support, being viewed substantially from line 3—3 on Fig. 1;

Fig. 4 is a right-end view of the valve parts of Fig. 1; and

Fig. 5 is a front elevation but eliminating the supporting bracket and the measuring mechanism shown in Fig. 1.

Similar reference characters indicate corresponding parts throughout the several views of the drawings.

Referring now more particularly to Fig. 1, the valve per se is shown in general at V. A typical device served by the valve is an injector shown in general at I. The injector I forms no part of the invention per se but shows a typical use of the valve.

The valve comprises the body 1 of elongate square section, a side of the square being less than the length of the valve body 1. The body

2

1 is centrally bored as shown at 3. The bore 3 ends in stepped counterbores 5 and 7, the bases of these counterbores being angular chamfers as shown. The step of each counterbore seats a metal washer. The washer in counterbore 5 is numbered 9 and that in counterbore 7 is numbered 11. The washer 11 of counterbore 7 seats a solid, circular resilient disc or gasket 13. The washer 9 of counterbore 5 seats a resilient gasket 15. This gasket 15 (unlike gasket 13) has a hole through it for slidably accommodating but hugging a valve stem 17. The purpose of each of washers 9 and 11 is to press upon gasket 15 or 13, respectively. Slight chamfers are provided outside of the gaskets for easy assembly into the counterbores of the washers and gaskets.

The counterbores are enclosed by rectangular heads 19 and 21 which preferably fit flush on the end of the body but provide projecting supporting lugs in which are suitable openings for receiving holding bolts 23.

Fastening for the heads 19 and 21 is constituted by squared arrangements of allen-head screws 25. The square arrangement of these is accurate enough that the heads may be placed in any one of four positions on the ends of the body 1. This allows the lugs of the heads to be placed in any plane desired, for example at 0°, 90°, 180° and 270°.

On one side of the body 1 is a delivery or outlet port 27 connected by passages 29 with the said counterbores 5 and 7. Passages 29 may conveniently be directed at an angle through the counterbores when the heads 19 and 21 are absent.

The stem 17 passes through an opening in the head 19. This stem at its inner end has threaded to it a supporting rod 31 (Fig. 2). At its outer end this rod carries a nut 33 and lock nut 35 forming a head. At the base of stem 17 is a spacing washer 37. The space between the head constituted by the nuts 33 and 35 and the member 37 is slightly longer than a piston valve member 39 which is loosely carried on the extension 31. Thus the piston valve member 39 has a loose connection with rod 31, both radially and axially. It is essentially smaller than the bore 3, except for two spaced circular lands 41, which, after reaming of the bore 3, are lap-fitted therein.

Opposite the delivery port 27 the body 1 is provided with a pressure supply or inlet port 43. Symmetrically spaced from port 43 are first and second transfer ports 45 and 47. The space between the lands 41 is enough to connect the port 43 either with port 45 or 47 in one or another extreme position of the valve body 39. When one port 45 or 47 is connected with 43, the other port 45 or 47 is connected to the port 27, as is clear from Fig. 1.

The device is carried upon a bracket 49, provided with an opening 51 accommodating the usual fittings in the ports 43, 45 and 47. Pipes 53 and 55 respectively connect the ports 45 and 47 with opposite ends of an injector cylinder 57 in which is a floating piston 59. At the left end of this cylinder 57 is an adjustable stop member 61 which limits the movement of the piston 59. When the valve 39 is set into its extreme left-hand position adjacent head 19, as shown in Fig. 1, lubricant may find its way from inlet port 43 to transfer port 45, line 53, thus pushing the piston 59 to the right. This forces a measured amount of lubricant over the line 55 through port 47, bore 3, passage 29 and out the port 27. Then it is delivered, for example, to a bearing to be lubricated. By shifting the valve 39 to the right-hand end of its stroke adjacent head 19, the action is reversed, the piston 59 moving to the left and forcing lubricant out over line 53 to the outlet 27.

In order to operate the valve 39, a lever 63 is provided with a pin-slotted connection 65 with the rod 17. The lower end of the lever 63 is pivoted at 67 to an extension 69 carried in the head 19. By means of this lever 63 the valve may be set.

A feature of the invention is the radial and axial lost-motion connection between the valve 39 and the extension 31. This in view of the lap fit between the lands 41 and the bore 3 provides a very reliable, leak-proof valve which is not subjected to binding due to any strains that might be imposed upon head 19 in tightening the supports for the heads 19 and 21. Thus rod 17 will not bind, and full advantage may be taken of the lap-fit construction.

Another feature is the packed-counterbore construction at both ends of the bore 3. It might be believed that the solid-disc packing at the right-hand end of Fig. 1 would be unnecessary, because the body 1 could be integrally closed in at this end, that is, by making bore 3 of the dead-end type. However, an opening at this end of the cylinder permits of proper lapping which a dead-end cylinder would not. Thus the separate head construction with dead-end packing is preferable. Furthermore, this makes both ends of the body 1 identical and symmetrical so far as machine operations are concerned which favors accurate manufacture. Leakage through the packing 15 is small.

It will be observed that the pressure on the outside ends of the lands 41 is less than that on the inside by the amount lost in fluid friction in driving the injector I. So far as the high pressure between the lands 41 is concerned, this is exactly balanced axially. The lower outside pressure is only out of balance by the amount brought about by the area of the rod 17 which intrudes through the head 19.

On one outer wall of the prism formed by the body 1 (but not a wall carrying the ports 27, or 43, 45, 47) are two threaded holes 71. These are shown in Fig. 5 wherein the bracket 49 is shown as having been removed. The purpose of these holes is to mount the device against any wall or the like, without the bracket 49. It will be noted in this connection that the heads 19 and 21 may be located in any of their various possible angular positions so as to accommodate mounting as desired either by means of the threaded holes 71 or the bracket. For example, as shown in Fig. 4, the plane PE of the valve ports as shown in Fig. 1 may be rotated to the horizontal position QR. This may be done without changing the position of the bracket 49 and heads 19 and 21 by loosening the fastenings 25 and making a reconnection with the body 1. This would then place the fittings in the horizontal dotted-line position shown in Fig. 4. Also, in this horizontal position of the fittings, the holes such as 71 could be used to effect fastenings on horizontal surfaces either above or below the device.

It will be noted that to prevent undue leakage out around the stem 17, it must have a fairly accurate fit through the opening in the head 19. Thus if the head 19, along with the head 21, is to be used as a mounting support for the assembly, the loose fit between the valve 39 and the extension 31 of the stem is quite useful to prevent the strains on the head 19 which might tend to cock the stem 17 from being applied to the valve 39.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A valve comprising a body having a longitudinal bore provided with open counterbores at both ends, said body also having a passage connecting said counterbores to an outlet port, separate heads attached to said body at its ends and covering said counterbores, one of said heads being solid and the other having an opening, packing in both of said counterbores, the packing under the head without an opening being solid and the other packing having an opening, said body having an inlet port, a first transfer port located between the inlet port and the head having the opening, and a second transfer port located between the inlet and the other head, all in communication with said bore, a valve member having axially spaced lands slidable in said bore between a first position adjacent the head having the opening wherein it connects said inlet and first transfer ports through the space between the lands and connects said second transfer port through said bore, the counterbore adjacent the solid head and the passage to the outlet port, and a second position adjacent the solid head wherein it connects said inlet and second transfer ports through the space between the lands and connects said first transfer port through said bore, the other counterbore and the passage to the outlet port, and a valve stem coupled to the valve member and passing through the head with the opening and through the opening of the adjacent packing.

2. A valve as set forth in claim 1, wherein said valve member has a close fit in the bore and a loose connection with said valve stem.

3. A valve as set forth in claim 1, wherein said heads form supporting extensions and are fastened to the body by removable fasteners permitting the heads and body to be fastened in any one of a plurality of different angular positions, a lever pivoted on the head having the opening and articulated to the valve stem, said valve stem having a loose connection with the valve member, said fasteners being so related to the axis of the valve stem that reconnections of the heads may be made to the body without interfering with the proper articulation between the lever and the valve stem.

VICTOR G. KLEIN.
LUTWIN C. ROTTER.

REFERENCES CITED

The following references are of record in the file of this patent:

UNITED STATES PATENTS

| Number | Name | Date |
|---|---|---|
| 1,036,923 | Smith | Aug. 27, 1912 |
| 1,374,405 | Steiner | Apr. 12, 1921 |
| 1,716,881 | Francis | June 11, 1929 |
| 1,947,409 | Elten | Feb. 13, 1934 |
| 2,215,115 | Buffington | Sept. 17, 1940 |
| 2,295,948 | Henry | Sept. 15, 1942 |
| 2,317,628 | Martin | Apr. 27, 1943 |
| 2,397,589 | Barnby | Apr. 2, 1946 |
| 2,410,404 | Buchanan | Nov. 5, 1946 |
| 2,418,448 | Arbogast | Apr. 8, 1947 |